(12) United States Patent
Monti

(10) Patent No.: US 7,503,154 B2
(45) Date of Patent: Mar. 17, 2009

(54) DEVICE FOR FEEDING ARTICLES, IN PARTICULAR CORKS, TO A PICK-UP STATION

(75) Inventor: Giuseppe Monti, Pianoro (IT)

(73) Assignee: Marchessini Group S.p.A., Pianoro (Bologna) (IT)

( * ) Notice: Subject to any disclaimer, the term of this patent is extended or adjusted under 35 U.S.C. 154(b) by 0 days.

(21) Appl. No.: 11/696,218

(22) Filed: Apr. 4, 2007

(65) Prior Publication Data

US 2007/0234682 A1    Oct. 11, 2007

(30) Foreign Application Priority Data

Apr. 7, 2006   (IT) .......................... BO2006A0261

(51) Int. Cl.
*B67B 1/04* (2006.01)
*B65B 7/28* (2006.01)

(52) U.S. Cl. ............................... 53/306; 53/308; 53/319

(58) Field of Classification Search .......... 53/306–312, 53/319, 330; *B67B 1/04*
See application file for complete search history.

(56) References Cited

U.S. PATENT DOCUMENTS

| | | | | |
|---|---|---|---|---|
| 1,140,832 A | * | 5/1915 | Jungnickel | 53/304 |
| 2,797,541 A | * | 7/1957 | Cookson | 53/306 |
| 2,826,885 A | | 3/1958 | Henderson et al. | |
| 3,415,037 A | * | 12/1968 | Bergeron et al. | 53/308 |
| 3,432,989 A | * | 3/1969 | Bouzereau | 53/264 |
| 3,683,588 A | * | 8/1972 | Ahlers | 53/64 |
| 3,710,924 A | | 1/1973 | Schultz | |
| 3,803,800 A | | 4/1974 | Tavernier | |
| 3,807,133 A | * | 4/1974 | Simonazzi | 53/306 |
| 3,859,973 A | | 1/1975 | Dreisin | |
| 3,975,886 A | | 8/1976 | Waters | |
| 4,373,316 A | * | 2/1983 | Kobayashi | 53/67 |
| 4,732,278 A | * | 3/1988 | Zangenfeind et al. | 209/546 |
| 4,932,824 A | * | 6/1990 | Goslin | 53/306 |
| 4,995,781 A | | 2/1991 | Herzog | |
| 5,115,617 A | | 5/1992 | Lewis et al. | |
| 5,285,618 A | * | 2/1994 | Bernhard | 53/308 |
| 5,309,696 A | * | 5/1994 | Heudecker et al. | 53/306 |

(Continued)

FOREIGN PATENT DOCUMENTS

EP    0541077 A    5/1993

(Continued)

OTHER PUBLICATIONS

European Search Report dated Jul. 12, 2007.

*Primary Examiner*—Stephen F Gerrity
(74) *Attorney, Agent, or Firm*—William J. Sapone; Coleman Sudol Sapone P.C.

(57) ABSTRACT

In a feeding device, a feeding channel receives articles, or corks, supplied, with a selected orientation, by a selector situated upstream of the device. The feeding channel has, downstream of an initial section, a descending track, in which the articles, or corks are made to slide, due to gravity, toward an outlet section. A first stop, situated in the outlet section, causes an accumulation of articles, or corks, arranged in row, one after another. An extractor is situated at the outlet section to move, with a selected pace, a foremost article, or cork, situated each time ahead of other articles, along a guide toward the discontinuous picking up station for supplying a gripper working at said station.

5 Claims, 3 Drawing Sheets

U.S. PATENT DOCUMENTS 5,531,057 A * 7/1996 Coleman et al. ............... 53/308
6,115,992 A    9/2000 Bankuty et al.
6,430,896 B1   8/2002 Torikian
6,658,814 B2 * 12/2003 Spatz et al. ................... 53/306

FOREIGN PATENT DOCUMENTS

| | | |
|---|---|---|
| EP | 1167276 A | 1/2002 |
| EP | 1431180 A | 6/2004 |
| FR | 2045132 A | 2/1971 |
| GB | 1035549 B | 7/1966 |
| GB | 1061705 B | 3/1967 |

* cited by examiner

FIG. 2

DEVICE FOR FEEDING ARTICLES, IN PARTICULAR CORKS, TO A PICK-UP STATION

FIELD OF THE INVENTION

The present invention relates to the technical field of the automatic machines for filling and corking containers such as bottles, and the like.

In particular, the device relates to a device for feeding corks to be used to close said containers.

It is to be specified that the above mentioned technical field has been indicated as a non limiting example, since the technical solution proposed by the present invention allows to obtain a device, which can be used also in other fields, in which it is required to feed, with a regular pace, other articles instead of corks.

Therefore, it is understood that the following description, referred to corks for convenience's sake, can be extended to other generic articles of similar shape.

BACKGROUND OF THE INVENTION

According to the prior art, the corks are introduced in bulk into the drum of a vibrating feeder or of a mechanical sorter (called also selector), from which the corks are picked up, oriented, arranged in row and directed to the outlet, where picking up means operate to pick them up one by one and to transfer them to a cork applying station.

The forward movement of the row of corks in the outlet channel, extended horizontally, is caused, in case of vibrating feeders, by the thrust applied by the vibrating action, which is suitably prepared for this purpose, to obtain a component according to a desired horizontal direction.

On the other hand, in case of mechanical sorters, the forward movement of the row is caused by the thrust, applied upstream by the new corks, which are progressively placed at the end of the row.

Obviously, said vibrating feeders and mechanical sorters are dimensioned in such a way, as to supply a medium number of corks, which is larger than the number required by the picking up means.

However, this does not always assure regular feeding of corks to the picking up means, because there can occur transitory, casual situations, which cause "empty spaces" in the row of corks at the outlet (vibrating feeders), or the stop of the row (mechanical sorters), which results in the lack of delivery of the cork to said means in the time interval between one picking up and another.

The main reason, which can cause the above mentioned unexpected situations derives from the fact that the corks are oriented in a wanted outlet order by a passive selection, that is only correctly oriented corks are allowed to pass toward the outlet channel, whereas the others are made fall again into the drum and thus reintroduced into the circulation from the beginning.

If, by any circumstance, an anomalous number of corks in a faulty orientation are fed, a feeding lack can occur transitorily, which results in the row discontinuity or the lack of thrust of the row toward the outlet, even if the medium average rate of corks supplied by system remains larger than the necessary demand.

A first system, which tries to resolve the above mentioned problem includes the over-dimensioning of the vibrating feeder or mechanical selector, so that the average number of corks supplied is much higher than the necessary one.

However, not only is there any absolute security of regular feeding, there is also an increase of dimensions of the above mentioned apparatuses, which is not always compatible with the requirements of the machine, to which they are associated.

According to another solution, the compacting and forward movement of the row of corks is helped by one or more jets of compressed air delivered by relative nozzles.

According to a further known solution, the cork outlet channel is associated to a belt conveyor or a similar device.

The above additional means resolve the functional problem, but they are not recommended if the system is aimed at working in a sterile environment.

Actually, in this case it becomes difficult, or even impossible, to maintain the corks sterile, as they are certified when delivered, if they are subjected to jets of non totally sterile air or to contact with the moving means, which can release polluting particles due to friction between them or with the corks.

Known devices for feeding pickup station of filling and plug applying machines, substantially as reported in the preamble of the independent claim, are described in various publications such as U.S. Pat. No. 3,859,973, GB-B-1 035 549, GB-B-1 061 705, U.S. Pat. Nos. 3,975,886, 3,710,924, 2,826,885, 4,995,781, 5,115,617, 6,115,992 and 6,430,896.

All the above mentioned publications reports about a feeding channel supplying corks by gravity to a cork applying machine.

SUMMARY OF THE INVENTION

The object of the present invention is to propose a device for feeding articles, in particular corks, to a discontinuous picking up station, with such device being associated downstream of a known vibration feeder, or of a known mechanical selector, and aimed at assuring a continuous flow of the above articles or corks, to said picking up station.

Another object of the present invention is to propose a device, which is structured in such a way, that it can be used in sterile environment without jeopardizing the certified sterility of the articles or corks.

A further object of the present invention is to propose a device, which includes few simple elements, so that it can be easily and efficiently sanitized, if it is to be used in a sterile environment.

The above mentioned objects are obtained, in accordance with the invention, by a device for feeding articles, in particular corks, to a discontinuous article picking up station, the device including:

a feeding channel including an initial section, for receiving said articles, or corks, supplied with a selected orientation by selecting means, situated upstream of the device, a descending track following the initial section for making the articles or cork slide, due to gravity, and an outlet section;

first stop means, situated at said outlet section for causing accumulation of said articles, arranged in a row, along the descending track;

extractor means acting at said outlet section, for moving a foremost article situated each time ahead of the articles toward said discontinuous picking up station, and for supplying the article or cork being moved to gripping means operating at said picking up station.

BRIEF DESCRIPTION OF THE DRAWINGS

The characteristic features of the invention are pointed out in the following description of a preferred embodiment, in accordance with the contents of the claims and with help of the enclosed drawings, in which:

Figure 2:
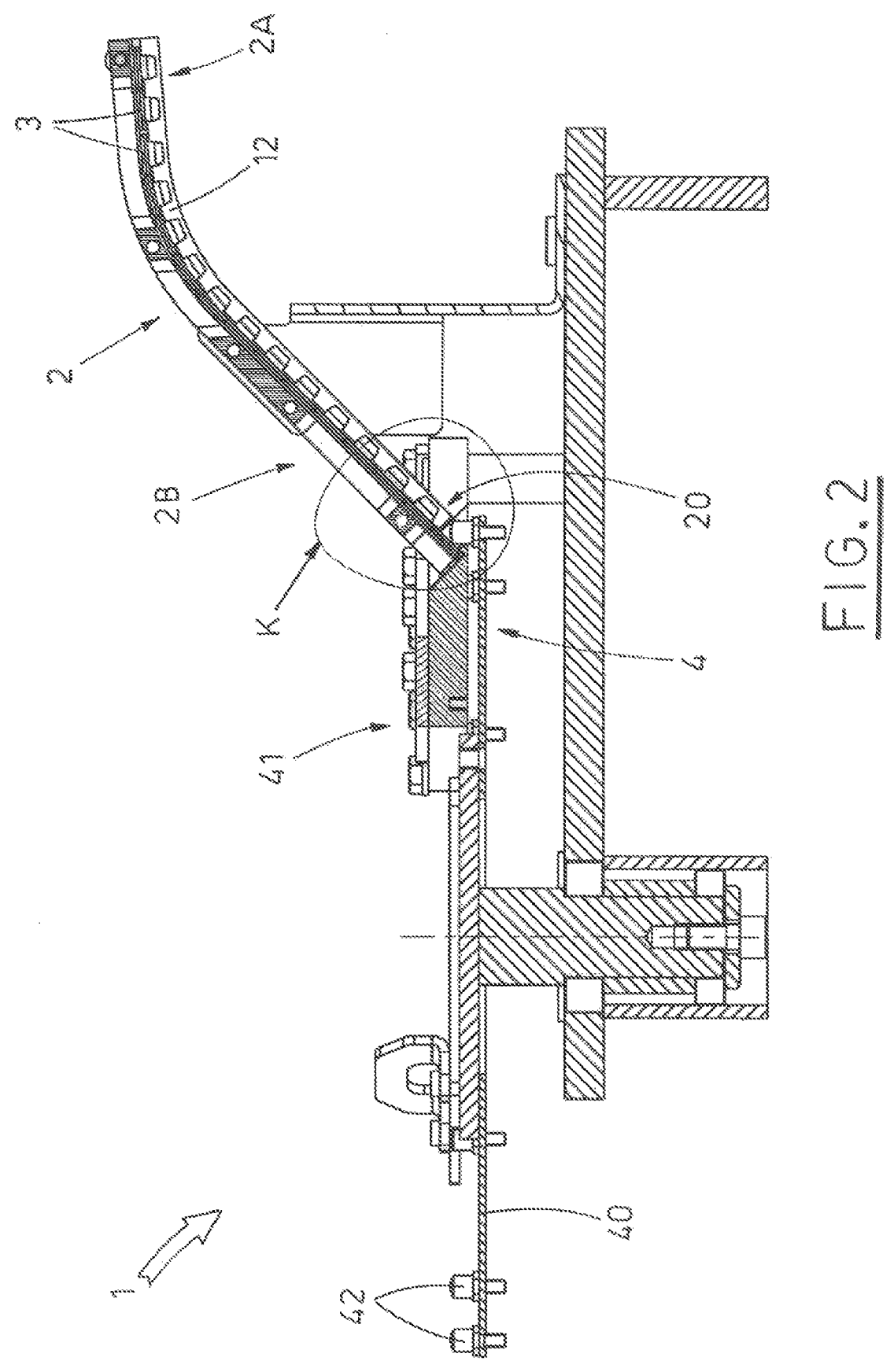

FIG. 2 is a sectional view of the proposed device, taken along the line II-II of FIG. 1;

DISCLOSURE OF THE PREFERRED EMBODIMENT

Figure 1:
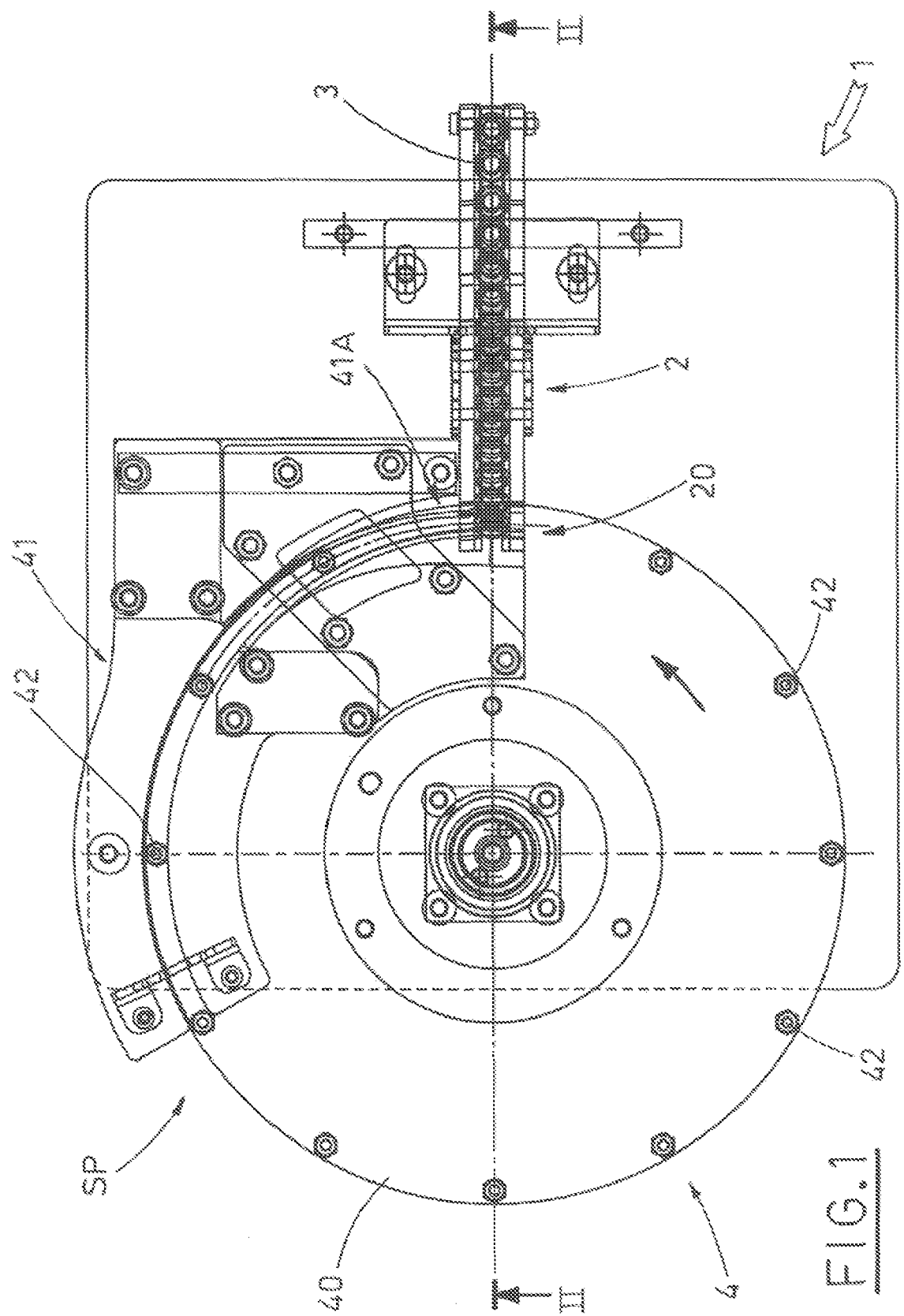
FIG. 1 is a top view of the proposed device.
Figure 3:
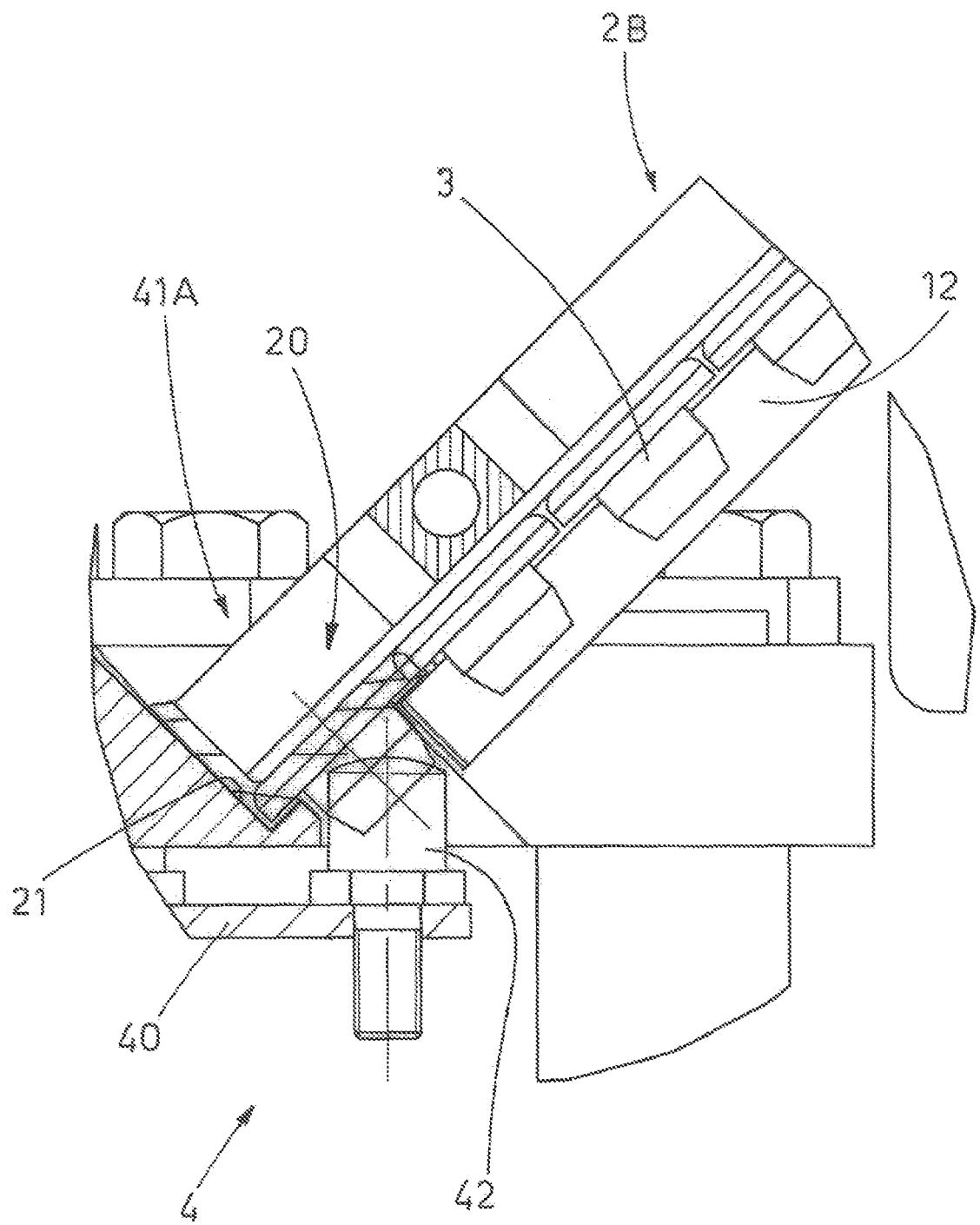
FIG. 3 is an enlarged view of detail K of FIG. 2.

Having regard to the above mentioned figures, the reference numeral 1 indicates the proposed device, as a whole.

The device 1 is interposed between the selecting means of known type, situated upstream, and gripping means, likewise of known type, situated at a discontinuous picking up station SP, located downstream.

The selecting means, for example a vibrating feeder or a mechanical sorter, mentioned in the introductory note, have not been shown, since they are not relevant to the invention like the gripping means of the picking up station SP.

The above mentioned selecting means are aimed at supplying the articles 3 in a prefixed orientation and in an average number, calculated for example on an hourly basis or per minute, slightly higher than the number of articles 3 picked up in the same time interval by the gripping means in the picking up station SP.

The device 1, the selecting means and the gripping means are considered associated for example, to an automatic machine, not shown, aimed at filling and corking containers, such as bottles and the like, therefore in the enclosed Figures, the articles 3 are corks 3, for example mushroom-like cork.

Consequently, the following description will refer to the latter, although the technical solution proposed by the invention can be applied also to corks of another type or to generic articles of similar shape, which require the same operation way to feed the gripping means.

The device 1 includes a feeding channel 2, aimed at receiving the corks 3 from the selecting means and having support and guiding means 12, which are shaped according to the cork size, so as to maintain the prefixed orientation of the corks 3 (or other similar articles).

The guiding means 12 are shaped in such a way, as to limit, as much as possible, the surface touching the corks 3, so as to limit the friction, obtaining an increase in smoothness as well as a maximum reduction of rubbing, which can cause detachment of particles.

The last characteristic is particularly advantageous, when the device is to be used in sterile environment.

The feeding channel 2 includes, from the beginning, an initial section 2A, almost horizontal, joined to a descending track 2B, which finishes at an outlet section 20.

The slope angle and the length extension of the descendent track 2B is defined particularly according to the article 3 type.

The corks 3, which are introduced into the feeding channel 2, cover first the initial section 2A, pushed by the other, following them, then they enter the descending track 2B, where they are made slide, due to gravity, toward the outlet section 20.

The first cork 3 goes in abutment against first stop means 21, for example a front stop situated in the outlet section 20, and consequently, the other corks accumulate behind it, forming a row, which extends gradually along the whole length of the feeding channel 2.

Extractor means 4, situated in said outlet section 20, downstream of the feeding channel 2, are aimed at picking up, according to a selected pace, the cork 3 situated each time ahead of the others, and at guiding it toward the discontinuous picking up station SP, to supply the gripping means.

The corks 3, which are situated along the descending track 2B, can go down due to gravity, independently from the fact that other corks, behind them, push them forward, therefore they form a supply compensation cork backup, which can keep the outlet section 20 fed even in case of transitory situations, as mentioned in the introductory note, which cause empty spaces in the row of corks, leaving the selecting means, or the stop of the row for short periods.

Second stop means, not shown, as known, are advantageously situated directly upstream of the outlet section 20 and are aimed at acting on the cork 3, which follows the foremost one, so as to prevent picking up of other corks 3 by the extractor means 4.

The second stop means can be operated in step relation with the extractor means 4 and with the machine operating means, for example to avoid the supply of a cork 3 to a container which, for any reason, has been found to be faulty or already rejected and removed from the line.

According to the shown example, the extractor means 4 include a disc 40, rotating continuously on a vertical axis, and a fixed guide 41, which has a circular section and is situated above the disc 40, concentric therewith.

The disc 40 lies on a horizontal plane, which is situated below the outlet section 20 and is placed in such a way, that the feeding channel 2 is arranged radial thereto, with the outlet section 20 situated toward the outermost portion of the disc 40 and vertically aligned with the initial part 41A of the fixed guide 41.

The latter extends, according to the rotation direction of the disc 40, beginning from the outlet section 20 and up to the picking up station SP.

The fixed guide 41 is open at bottom and has a cross section matching the size of the corks, so as it can support the corks 3 (or other similar articles).

The initial part 41A forms the front stop 21, which joins the above mentioned guide, which is oriented at the inlet of the initial part 41A in such a way as to receive the corks 3 in the inclined orientation assumed by the latter at the outlet section 20.

According to a preferred, but not exclusive embodiment, the fixed guide with the size matching profile, is progressively twisted in the extension direction, on respective vertical planes, so as to brings the corks 3 to a vertical position at the picking up station SP.

The disc 40 has a plurality of driving pegs 42, protruding upwards and situated angularly equidistant along a circumference, which has the same radius as the fixed guide 41.

Therefore, the driving pegs 42 are aimed at entering the fixed guide 41, at the outlet section 20, contacting the head cork 3 and pushing it along the whole extension of the fixed guide 41, up to the picking up station SP.

The cork 3 feeding pace depends on the disc 40 rotation speed, as well as on the angular spacing between the adjacent driving pegs 42.

The gripping means, which operate in the discontinuous picking up station SP, are operated with a suitable speed in relation to the above feeding pace, and in step relation with the arrival of each cork 3 carried by the relative driving peg 42.

According to a not shown embodiment, the fixed guide 41 has a straight extension, crosswise to the feeding channel 2 and the disc 40 is substituted by a belt conveyor, which likewise has driving pegs and is situated parallel to and below the fixed guide.

It is easy to understand from the above description that the just described device 1 can fully achieve the objects mentioned in the introductory note, by a solution which is as simple as efficient.

Actually, the presence of compensation cork backup, which is created in the descending track, assures a continuous flow to the outlet section, with a sufficient autonomy to cover the irregularities which can occur with known selecting means in the forward movement of the row of corks, without introducing any motorized mechanical means or other auxiliary means, such as compressed air.

The device includes few elements characterized by a simple shape, which have been studied to offer the minimum friction in the cork sliding, so that it is particularly suitable to be used in sterile environment, and it is also, in this case, easily and efficiently sanitized.

Moreover, the proposed device is cheap to manufacture and handle, within the machine operation, because only the rotation of the disc with the driving pegs must be controlled.

Finally, the easiness of substitution of the matching elements, allows to reduce to the minimum the machine stop times.

What is claimed is:

1. A device for feeding cork shaped articles to a discontinuous article picking up station, the device comprising:

a feeding channel including an initial section, for receiving said cork shaped articles supplied with a selected orientation by selecting means, situated upstream of the device, a descending track following the initial section oriented at a slope angle for making the cork shaped articles slide, due to gravity, and an outlet section, the outlet section being inclined at a slope angle corresponding to the slope angle of the descending track;

first stop means, situated at said outlet section for causing an accumulation of said cork shaped articles, arranged in a row, along the descending track, the first stop means including a front stop for stopping and holding the cork shaped articles in a position corresponding to the slope angle of the outlet section, the stop means maintaining the cork shaped articles in the same orientation that the cork shaped articles had during travel along the descending track of the feeding channel;

extractor means acting at said outlet section, for moving a foremost cork shaped article situated at a head of the accumulated row of cork shaped articles toward said discontinuous picking up station, and for supplying the cork shaped article being moved to gripping means operating at said picking up station, said extractor means including a disc, rotating about a vertical axis and situated below said outlet section, and a fixed guide shaped as a circle sector and situated above the disc, concentric with the disc, said guide extending in a rotation direction of the disc, starting from the outlet section up to said picking up station, and having a profile open at a bottom thereof for receiving and supporting said cork shaped articles, said disc having a plurality of driving pegs, extending upwards and arranged angularly equidistant along a circumference having the same radius as said fixed guide, said driving pegs entering the guide at said outlet section, to contact said foremost cork shaped article and to push said foremost cork shaped article along said fixed guide up to said picking up station.

2. A device, according to claim 1, wherein said disc is placed in such a way that said feeding channel is arranged radial thereto, with said outlet section oriented toward the outermost portion of the disc.

3. A device, according to claim 1, wherein a cross-sectional profile of the fixed guide at an inlet of said initial part is oriented in an inclined orientation for receiving said cork shaped articles in an orientation corresponding to the orientation taken by cork shaped articles in said outlet section.

4. A device, according to claim 1, wherein a cross-sectional profile of the fixed guide at an inlet of said initial part of the fixed guide, is oriented, in an inclined orientation for receiving said cork shaped articles with an orientation corresponding to an orientation taken by cork shaped articles in said outlet section, said cross-sectional profile being progressively rotated, in respective vertical planes situated in an extension direction of the fixed guide, to determine a vertical position of the cork shaped articles at said picking up station.

5. A device, according to claim 1, wherein said front stop is formed by said fixed guide.

* * * * *